H. R. EVANS.
SOAP DISPENSING MACHINE.
APPLICATION FILED MAR. 13, 1912.

1,191,071.

Patented July 11, 1916.
3 SHEETS—SHEET 1.

Witnesses:

Inventor
Henry R. Evans.
By his Attorneys
Kenyon & Kenyon

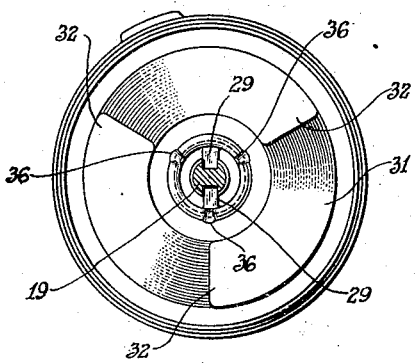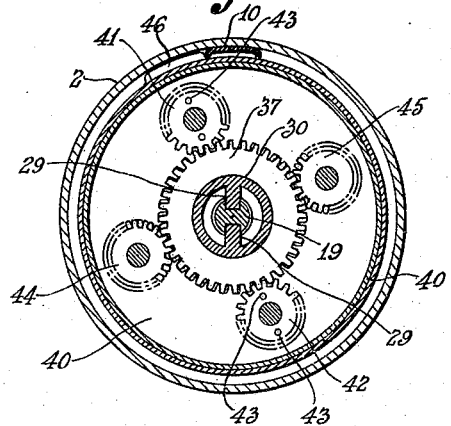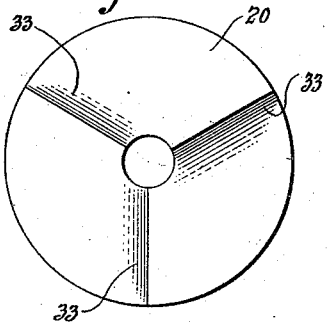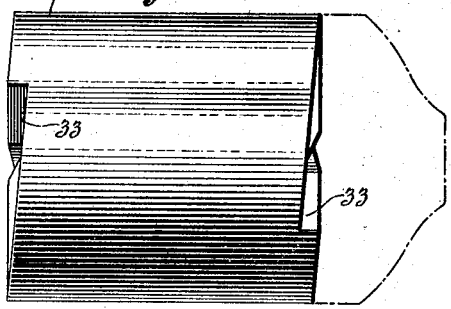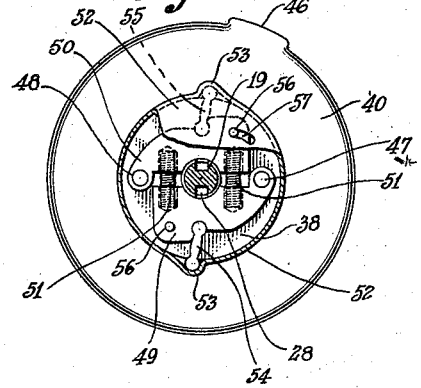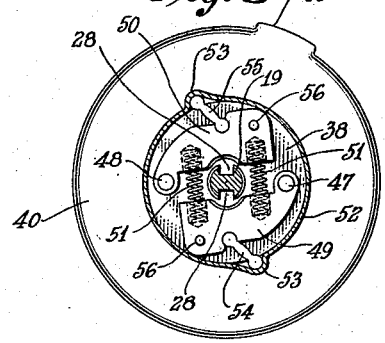

H. R. EVANS.
SOAP DISPENSING MACHINE.
APPLICATION FILED MAR. 13, 1912.
1,191,071.
Patented July 11, 1916.
3 SHEETS—SHEET 3.
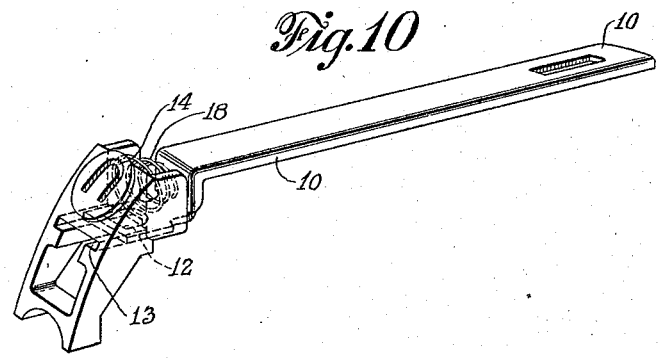
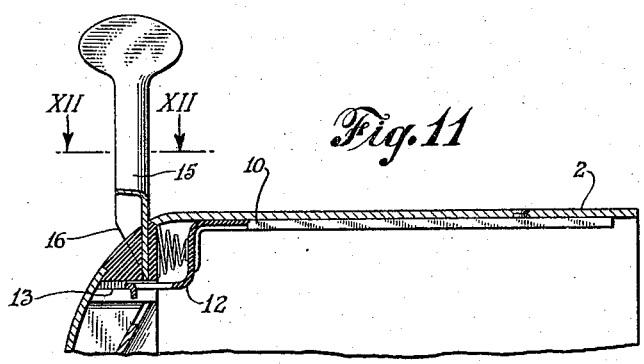
Witnesses:
Inventor
Henry R. Evans
By his Attorneys
Kenyon & Kenyon

UNITED STATES PATENT OFFICE.

HENRY R. EVANS, OF NEW YORK, N. Y.

SOAP-DISPENSING MACHINE.

1,191,071.　　　　　Specification of Letters Patent.　　Patented July 11, 1916.

Application filed March 13, 1912. Serial No. 683,495.

*To all whom it may concern:*

Be it known that I, HENRY R. EVANS, a citizen of the United States, and a resident of New York city, county and State of New York, have invented certain new and useful Improvements in Soap-Dispensing Machines, of which the following is a specification.

My invention relates to improvements in dispensing machines, and more particularly to soap dispensing machines, in which a cake of soap is granulated or comminuted when desired for use.

One object of my invention is to provide a machine which is simple and efficient in construction and operation, and economical in manufacture and use.

A further object of my invention is to provide a machine in which the soap may be positively fed with respect to the cutter or granulating means, and at a properly reduced speed with respect to the rotation of the soap, and in which the means for accomplishing this is simple and efficient, and conveniently placed within the apparatus, and in which a follower is provided for the soap, which follower carries the speed reducing means for positively feeding the soap.

A further object of my invention is to provide a simple and efficient means for locking parts of the apparatus together, whereby they may be quickly taken apart for the insertion of new cakes of soap or other material.

A further object of my invention is to provide a new form of feeding device which may be quickly disengaged so as to allow the quick refilling of the apparatus with fresh soap.

Further objects, features and advantages will more clearly appear from the detailed description given below taken in connection with the accompanying drawings which form a part of this specification.

Figure 1:
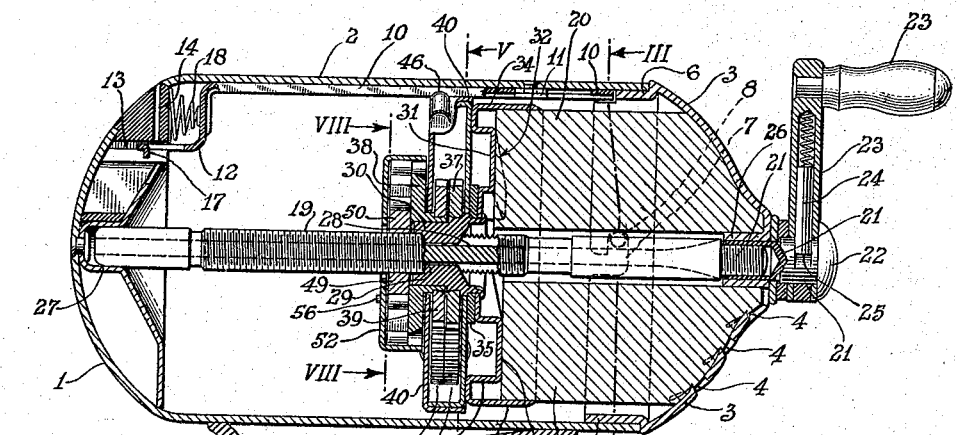
Figure 2:
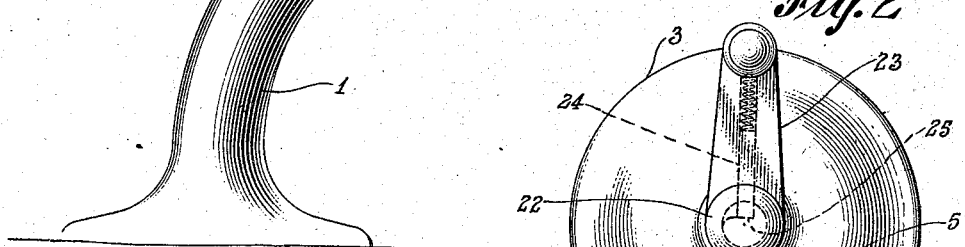
Figure 3:
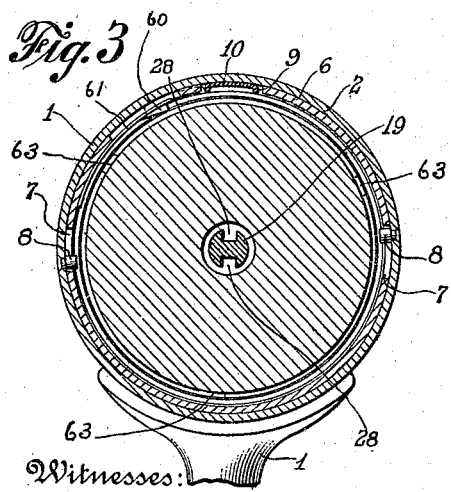

In the drawings, Figure 1 is a vertical section through a machine embodying my invention in one form. Fig. 2 is a front view of the machine shown in Fig. 1. Fig. 3 is a section taken on the line III—III of Fig. 1. Fig. 4 is an elevation of the follower of the machine shown in Fig. 1. Fig. 5 is a section taken on the line V—V of Fig. 1. Fig. 6 is an end view of a cake of soap such as may be used in my improved machine. Fig. 7 is a side view of such a cake of soap. Fig. 8 is a section taken on the line VIII—VIII of Fig. 1. Fig. 9 is a similar view, but showing the split nut in closed position. Fig. 10 is a detailed view of the device for locking the cutter head in position. Fig. 11 is a detailed section showing the key in conjunction with the locking device. Fig. 12 is a section of the key, taken on the line XII—XII of Fig. 11.

Referring to the various figures, 1 represents a suitable frame comprising a cylindrical container 2. At the front of the frame or container 2 is a cutter head 3 provided with suitable cutting means or knife edges 4, with apertures 5, so as to form a suitable cutter or granulating means for the machine. The cutter head 3 is provided with a flange 6 adapted to be inserted in the member 2, which flange is provided with notches 7 adapted to coöperate with pins 8 fixed to the cylinder 2 in order to form a bayonet joint to secure the cutter head 3 to the fixed frame of the machine. The flange 6 is provided with a recess 9 at its top into which is adapted to slide the end of a sliding locking member 10. The sliding locking member 10 is guided in its movement by a guide 11 rigid with the cylinder 2, and is provided with a depressed arm 12 sliding in a guideway 13 rigid with the frame of the machine. A U shaped slot is provided at 14, on the frame of the machine, into which is adapted to be inserted a key 15 of similar shape, which key is provided with beveled edges 16 adapted to coöperate with the face 17 on the arm 12 in order to force the arm and member 10 to the left, as shown in Fig. 1, against the action of a spring 18.

19 represents a screw threaded shaft passing centrally through the apparatus and centrally through the soap 20. Screw threaded upon the right hand end of the shaft is an extension 21 provided with an integral head 22. Journaled about the extension 21 is a crank handle 23 provided with a spring pressed pin 24 adapted to engage a depression 25 to form a pawl and ratchet arrangement, whereby when the handle 23 is turned in a clockwise direction, as seen in Fig. 2, it will cause the shaft 19 to be likewise rotated, but when the handle 23 is turned in the opposite direction the pin 24 will slip over the surface of the extension 21, and thus will not cause rotation of the shaft 19. At one end the shaft 19 or the extension 21 is journaled in bearings at 26, and at the other end in bearings at 27. The screw threaded shaft 19 is provided with two longitudinal slots 28, one directly opposite the other. Fitting in these slots are arms 29 integral with a member 30 forming part of a follower for the cake of soap 20. Rigidly secured to the member 30 and forming part of the follower, is a sheet metal member 31 provided with suitable depressions 32 stamped therein which are adapted to engage with corresponding depressions 33 in the face of the cake of soap 20. The member 31 is also provided with an integral flange 34 adapted to engage the periphery of the cake of soap and hold it in proper alinement. A washer 35 is placed between the member 31 and the member 30, but all three parts are rigidly secured together by locking projections 36 (see Fig. 4). Rigidly secured to the member 30 is a gear 37. Loosely journaled upon the member 30 is a rotating member 38 having rigidly secured thereto a gear 39.

Loosely journaled about the members 30 and 38 is a hollow casing 40 made of two members secured together, as by peripheral flanges. Journaled in the casing 40 are two pairs of gears 41 and 42, the gears of each pair being secured together by pins 43. One each of the gears of these pairs 41 and 42 mesh respectively with the gears 37 and 39 (see Figs. 1 and 5). Also journaled in the casing 40 are two pairs of gears 44 and 45, which may or may not be rigidly connected together. The casing 40 is prevented from rotating with respect to the frame and cutter by means of a projection 46 which comes against the sliding member 10 which acts as a stop therefor. The gear 39 is provided with two teeth more than the gear 37, while the gears of the pairs 41, 42 and 44, 45, are all provided with the same number of teeth.

Pivotally mounted on the member 38, at 47 and 48, are two parts 49 and 50 forming a split nut with threads adapted to coöperate with the screw threads upon the shaft 19. These parts 49 and 50 are normally pressed apart by means of springs 51 (see Figs. 8 and 9). Loosely journaled about the member 38 is a dished shaped member or casing 52 provided with depressions 53 therein. Extending between the depressions 53 and the parts 49 and 50, are links 54 and 55 so arranged that when the member 52 is turned in one direction the links 54 and 55 will force the parts 49 and 50 toward one another in order to cause their screw threads to come into operative engagement with the threads of the shaft 19, and when the member 52 is turned in the opposite direction the parts 49 and 50 are released and forced away from one another by the springs 51 so that the split nut is quickly disengaged from the shaft 19. The parts 49 and 50 are provided with pins 56 operating in slots 57 which limit the movement of the members between predetermined limits, and also assist the springs 51 when members 49 and 50 are caused to recede.

The operation of the machine will be clear from the following: Assuming the parts to be in the position shown in Fig. 1, then when handle 23 is turned in a clockwise direction the shaft 19 will be likewise rotated, thus causing the rotation of the parts 30 and 31, because of the arms 29 extending into the slots 28 in the member 19. The follower 31 being locked with the soap 20 by its interlocks 32, will cause rotation of the soap 20 with respect to the cutting edges 4, so that the soap will be comminuted and dispensed through the openings 5.

It will be seen that the member 31 while being rotated by the shaft 19, is nevertheless allowed free longitudinal movement with respect thereto. Rotation of shaft 19 and member 30 causes rotation of the gear 37, which in turn causes rotation of the pairs of gears 41 and 42, having their axes fixed with respect to the frame, by means of the projection 46 engaging the sliding member 10. Rotation of the gears 41 and 42 causes rotation of the gear 39, but at a slightly different speed from the speed of rotation of the gear 37, because the gear 39 has two more teeth than the gear 37. Thus I have provided a differential gearing or reducing gearing by means of which the member 38 is caused to rotate very slowly with respect to the shaft 19. This slow rotation of the member 38 which carries the split nut, causes the nut to slowly feed its way longitudinally along the shaft 19 so that the follower and all of the other coöperating parts are slowly fed forward in order to positively feed the soap toward the cutter head 3.

If now it is desired to insert a new cake of soap the key 15 is inserted in the opening at 14, thus withdrawing the sliding member 10 against the action of the spring 18, from the cutaway portion in the flange 6 of the head 3, so that the head 3 may be slightly turned in order to unlock the bayonet joint at 7, 8, so that the head 3 and all of the parts carried upon the shaft 19, may be easily removed from the frame, or cylindrical containing member 2. The circular member 52 is then given a slight turn with respect to the remaining parts of the apparatus so that the links 54 and 55 allow the parts 49 and 50 to be separated under the action of springs 51. This disengages the split nut from the shaft 19, so that all of the follower parts may be readily slipped off of the shaft 19, the arms 29 of the member 30 sliding over the left hand end of the shaft 19 along the slats 28, as will be readily seen from Fig. 1. A new cake of soap may then be slipped over the shaft 19 and into engagement with the remaining portion of the previous cake by means of the interlocks 33 thereof and the follower parts again placed in position, the split nut closed, as shown in Fig. 9, then the parts inserted in the frame of the machine and locked therein, as already described. By the means described this operation may be done in a minimum amount of time and with great ease and simplicity. It will be seen that in the embodiment shown the reducing gears are carried along with the follower and are very compactly and simply arranged within the apparatus, thus insuring long life to the apparatus, and ease of manufacture.

At 60 I show a beveled button (see Fig. 3) which is resiliently pressed inwardly by means of a leaf spring 61 secured to the inside of the flange 6 of the cutter head. When the cake of soap has become nearly exhausted the button 60 will engage three openings 63 in the flange 34 of the follower as the follower revolves, thus causing a loud clicking noise which serves as a signal or notification that the machine should be refilled.

By arranging the cylindrical container 2 horizontally and having a dished cutter head fixed to the end on which is the handle 23, drip from the hand of the operator does not fall upon the device. Furthermore, it will be seen that the container 2 is closed to the outside atmosphere except at one end and this is closed by the cutter head 3 except for the small cutter openings 5 which are closed by the soap itself. This is important, since in rooms where the humidity is high the soap will become slimy if not substantially closed to the outside atmosphere. This has been a detriment in prior machines. Furthermore, it will be noted that the soap immediately after being cut drops directly into the hand of the operator, and does not have to go through any passageway before reaching the hand, which passageway would become clogged by the granulated soap. This improvement is largely brought about by having the cutter head dished and projecting from the end of the container. Since the feeding mechanism is all carried by the shaft 19 it is easily removed for repair, etc.

Although I have described my improvements in great detail and with respect to one particular embodiment of the invention, nevertheless I do not desire to be limited to such details except as clearly specified in the appended claims, since many changes and modifications may well be made without departing from the spirit and scope of my invention in its broadest aspects.

Having fully and clearly described my improvements in one form, what I claim as new and desire to secure by Letters Patent, is:

1. In a machine of the class described, granulating means, means for rotating the material with respect to the granulating means, and means for positively feeding the material toward the granulating means, said feeding means being mechanically connected to said rotating means so that both may be driven from the same source of power, and said feeding means embracing a follower for the material and differential gearing carried by said follower whereby the speed of feed is very slow as compared with the speed of rotation.

2. In a soap dispensing machine a cutter, means for rotating the soap with respect to the cutter and positively feeding the soap toward the cutter, said means embracing differential gearing for positively feeding the soap with respect to the cutter, said gearing embracing two coaxially arranged gears and a unitary gear meshing with both of them.

3. In a dispensing machine, comminuting means, means for rotating the material to be dispensed with respect to the comminuting means, and means for positively feeding the material with respect to the comminuting means, both of said means being mechanically connected together whereby they may be driven from the same source of power, said material feeding means embracing differential gearing whereby the material may be fed slowly as compared with the speed of rotation of the material with respect to the comminuting means.

4. In a dispensing machine, granulating means, means for rotating the material to be dispensed with respect to the granulating means, and positively feeding the material with respect to the granulating means, said means embracing a differential gearing for feeding the material whereby the material may be fed slowly as compared with the speed of rotation of the material with respect to the granulating means.

5. In a dispensing machine, a fixed frame, a cutter fixedly secured with respect to said frame, means for rotating the material to be dispensed with respect to the cutter, and means for positively feeding the material to the cutter, said feeding means being mechanically connected with the rotating means whereby both may be driven from the same source of power, and said feeding means embracing a follower carrying differential gearing to reduce the feeding speed.

6. In a dispensing machine, a fixed frame, a cutter fixed with respect to said frame for granulating the material to be dispensed, a rotatable screw threaded shaft passing through the material, a follower carried by the shaft and movable longitudinally of the shaft but rotatable with the shaft, and gearing between the follower and the shaft whereby the material is fed slowly.

7. In a soap dispensing machine, a soap cutter for comminuting the soap, a screw threaded shaft passing through the soap and rotatable with respect to the cutter, a follower carried by and driven by the shaft for positively feeding the soap to the cutter and gearing between the follower and the shaft whereby the material is fed slowly.

8. In a soap dispensing machine, a fixed frame, a cutter fixed with respect to said frame for granulating the material to be dispensed, a rotatable screw threaded shaft passing through the material and a follower carried by the shaft and movable longitudinally of the shaft, but driven by and rotatable with the shaft for positively but slowly feeding the material to the cutter.

9. In a soap dispensing machine, a fixed frame, a cutter fixed with respect to the frame, a screw threaded member for rotating the soap to cause it to be cut by the cutter and means for positively feeding the soap to the cutter from said member, said means embracing reducing gears in order that the soap may be fed more slowly relatively to its speed of rotation.

10. In a soap dispensing machine, a fixed frame, a cutter fixed with respect to the frame, a screw threaded member for rotating the soap to cause it to be cut by the cutter and means for positively feeding the soap to the cutter from said member, said means including differential gearing driven by said screw threaded member.

11. In a soap dispenser, a cutter, a follower for the soap and interlocking with the soap, means for rotating the follower to rotate the soap with respect to the cutter, said means including a shaft passing through the soap and a handle thereon adjacent the cutter, and means for simultaneously positively feeding the follower to positively feed the soap to the cutter.

12. In a soap dispenser, a fixed frame, a cutter fixed with respect to the frame, a screw threaded shaft passing through the soap, means for rotating said shaft with respect to the frame, a follower interlocking with the soap and rotated by said shaft to rotate the soap with respect to the cutter, a nut screw threaded on said shaft, and differential gears connecting the nut with the follower to cause the soap to be positively fed toward the cutter.

13. In a soap dispenser, a fixed frame, a cutter fixed with respect to the frame, a screw threaded shaft passing through the soap, means for rotating said shaft with respect to the frame, a follower interlocking with the soap and rotated by said shaft to rotate the soap with respect to the cutter, a nut screw threaded on said shaft, and differential gears connecting the nut with the follower to cause the soap to be positively fed toward the cutter, a slidable frame in which part of said gears are journaled and means for preventing rotation of the frame with respect to the cutter.

14. In a soap dispenser, a cutter, a screw threaded member, means for rotating the member with respect to the cutter, a follower interlocking with the soap to be dispensed and rotated by said member to rotate the soap with respect to the cutter, a nut coöperating with the screw threads of said member, and gears connecting the nut with the follower to cause the nut to feed the follower and soap positively toward the cutter.

15. In a soap dispenser, a cutter, a screw threaded member, means for rotating the member with respect to the cutter, a follower interlocking with the soap to be dispensed and rotated by said member whereby the soap is rotated with respect to the cutter, a split nut coöperating with the screw threads of said member, and gears connecting the nut with the follower whereby the nut feeds the follower and soap positively toward the cutter, a frame positively fed with the follower and in which part of said gears are journaled and means for preventing rotation of the frame with respect to the cutter.

16. In a dispensing machine, granulating means, means for rotating the material to be dispensed with respect to said granulating means, and means for positively feeding the material to the granulating means, said feeding means embracing a follower interlocked with the material, two coöperating screw threaded members, differential gears connecting one of the members with the follower to cause the follower and material to be slowly fed by said member and means for disengaging said screw threaded members from one another whereby they may quickly separate.

17. In a dispensing machine, granulating means, means for rotating the material to be dispensed with respect to said granulating means, and means for positively feeding the material to the granulating means, said feeding means embracing a screw threaded shaft, a split nut on the shaft and differential gears controlling the rotation of the nut with respect to the shaft.

18. In a dispensing machine, granulating means, means for rotating the material to be dispensed with respect to said granulating means, and means for positively feeding the material to the granulating means, said feeding means embracing a screw threaded shaft, a nut divided into two parts coöperating with the shaft to feed the material and means for separating the two parts of the nut to disengage it from the shaft, said last mentioned means comprising resilient means tending to separate said two nut parts and a surrounding frame piece, oscillation of which about said shaft permits the resilient means to separate the two nut parts.

19. In a dispensing machine, granulating means, means for rotating the material to be dispensed with respect to said granulating means, and means for positively feeding the material to the granulating means, said feeding means embracing two coöperating screw threaded devices for feeding the material, one of said devices being divided into two parts pivoted with respect to one another, and means for moving said parts relatively to one another to disengage one device from the other.

20. In a dispensing machine, a fixed cutter, a follower interlocking with the material to be dispensed, and means for rotating the follower and simultaneously positively feeding the same toward the cutter whereby the material is simultantously rotated with respect to and fed toward the cutter to be cut, said means including an operating screw threaded shaft passing through the material to be dispensed and having a bearing on each side thereof.

21. In a soap dispenser, a cutter, means for rotating the soap with respect to the cutter, a follower for the soap, and means for positively feeding the follower embracing two coöperating screw threaded members and means for rapidly disengaging one member from the other at any position they may occupy relative to one another and reducing gears whereby the feed of the soap to the cutter is made relatively slow as compared with the speed of rotation.

22. In a dispensing machine of the class described, granulating means, means for rotating the material to be dispensed with respect to the granulating means, and for positively feeding the material to the granulating means, said feeding means embracing a screw threaded shaft and a nut coöperating with the shaft to feed the material, said nut being divided into two parts, each pivotally mounted independently of the other, and means for moving said parts about their pivots to bring them out of and into operative engagement with said screw threaded shaft and resilient means tending to separate said parts to bring them out of operative engagement with said screw threaded shaft.

23. In a dispensing machine of the class described, granulating means, means for rotating the material to be dispensed with respect to the granulating means, and for positively feeding the material to the granulating means, said feeding means embracing a screw threaded shaft and a nut coöperating with the shaft to feed the material, said nut being divided into two parts, each pivotally mounted independently of the other, and means for moving said parts about their pivots to bring them out of and into operative engagement with said screw threaded shaft, said last mentioned means including a rotatable member and links connecting the rotatable member with said nut parts.

24. In a soap dispensing machine, a fixed frame, a dished cutter head removably but fixedly attached to said frame, said cutter head being provided with cutting means on its underneath side, means for rotating the soap with respect to said cutter head and positively feeding the soap toward said cutter head, said last mentioned means embracing shaft passing centrally through the soap, a handle on the outside of said cutter head for rotating said shaft, and means whereby said shaft rotates and positively feeds the soap.

25. In a soap dispenser, a fixed frame, cutter head removably attached to said frame, said cutter head being provided with cutting means on its underneath side, means for locking said cutter head to the frame, and adapted to be unlocked by a key, and means for rotating the soap with respect to the cutter head to cause the soap to be dispensed, said last mentioned means embracing a crank handle on the outside of said cutter head, a screw threaded shaft passing through the soap for positively feeding the soap toward the cutter head and turned by said crank handle, and means whereby the soap is rotated by said shaft.

26. In a soap dispenser, a fixed frame, a cutter fixedly secured to one end of said frame, a crank handle, a screw threaded shaft passing centrally through the soap to be dispensed and operatively connected to the crank handle to be turned thereby, a split nut formed in two parts and coöperating with said shaft to feed the soap toward the cutter head, and means whereby said nut is rotated both with respect to the shaft and said cutter head.

27. In a soap dispenser, a fixed frame, a cutter fixedly secured to one end of said frame, a crank handle, a screw threaded shaft passing centrally through the soap to be dispensed and operatively connected to the crank handle to be turned thereby, a split nut formed in two parts and coöperating with said shaft to feed the soap toward the cutter head, and means whereby said nut is rotated both with respect to the shaft and said cutter head, means whereby the shaft rotates the soap with respect to the cutter head, and means whereby the parts of said split nut may be quickly separated to disengage the nut from the shaft.

28. In a soap dispensing machine, a suitable container for the soap to be dispensed, a cutter head removably fixed to one end of the container, and means for feeding and rotating the soap, said means being carried by the cutter head, whereby the feeding and rotating means may be readily removed from the container with the cutter head.

29. In a soap dispensing machine, a suitable container for the soap to be dispensed, a cutter for dispensing the soap, means for rotating the soap with respect to the cutter, said means including a central shaft, and means for positively feeding the soap toward the cutter, said last-mentioned means embracing a set of reducing gears to reduce the speed of feed of the soap with respect to its speed of rotation, said gears being carried by said central shaft, whereby they are easily removable.

30. In a dispensing machine, a fixed cutter, a follower interlocking with a material to be dispensed, means for rotating the follower and simultaneously positively feeding the same toward the cutter whereby the material is simultaneously rotated with respect to and fed toward the cutter to be cut, said last mentioned means including a screw-threaded shaft, a nut operating on said shaft to feed the follower, reducing gears for rotating said nut with respect to the shaft, and means whereby said nut may be quickly disengaged from said shaft at any of its positions on said shaft.

31. In a device of the class described, the combination of granulating means and means for feeding the material to be dispensed to said granulating means comprising a screw-threaded shaft, a split nut operating on said shaft, a member to which both sections of the nut are pivoted, resilient means tending to separate the sections of said nut, and means for holding the sections of the nut in operative engagement with the shaft.

32. In a device of the class described, the combination of granulating means and means for feeding the material to be dispensed to said granulating means comprising a split nut having two sections, resilient means tending to force said sections apart, a rotating casing for said sections, and means whereby rotation of the casing with respect to the sections causes the sections to approach one another.

33. In a device of the class described, the combination of granulating means and means for feeding the material to be dispensed so said granulating means, comprising two gears 37 and 39 rotatable with respect to one another about the same axis, one of said gears having more teeth than the other, and intermediate gearing 42 engaging the teeth of both of said gears.

34. In a soap dispensing machine, a container for the soap, a cutter and means for rotating the soap with respect to the cutter, and means for producing a signal when the soap in the machine has become nearly exhausted.

35. In a soap dispensing machine, a container for the soap, a cutter and means for rotating the soap with respect to the cutter, and means for producing a signal when the soap in the machine has become nearly exhausted, said signal-producing means embracing a movable member adapted to engage a rotating member to produce a clicking sound.

36. The combination of a container, a cutter fixed to the container, a screw-threaded shaft passing through the container and adapted to be rotated with respect thereto, a follower carried by said shaft and positively rotated by the shaft but movable longitudinally of the shaft, to feed material to the cutter, a member movable longitudinally of the shaft with the follower but not rotatable with respect to the cutter and container, and means whereby the follower is fed toward the cutter by rotation of said shaft.

37. The combination of a container, a cutter fixed to the container, a screw-threaded shaft passing through the container and adapted to be rotated with respect thereto, a follower carried by said shaft and positively rotated by the shaft but movable longitudinally of the shaft, to feed material to the cutter, a member movable longitudinally of the shaft with the follower but not rotatable with respect to the cutter and container, and means whereby the follower is fed toward the cutter by rotation of said shaft, said last mentioned means embracing a split nut on said shaft and carried by said member, the parts of which are adapted to be separated to quickly disengage the same from the shaft and permit ready adjustment of the follower.

38. The combination of a container, a cutter, a shaft passing through the container and adapted to be rotated with respect thereto, a follower carried by said shaft and positively rotated by the shaft but movable longitudinally of the shaft, to feed material to the cutter, a member movable longitudinally of the shaft with the follower but not rotatable with respect to the cutter, and means whereby the follower is fed toward the cutter by rotation of said shaft.

39. The combination of a container, a cutter fixed to the container, a shaft passing through the container and adapted to be rotated with respect thereto, a follower carried by said shaft and positively rotated by the shaft but movable longitudinally of the shaft, to feed material to the cutter, a member movable longitudinally of the shaft with the follower but not rotatable with respect to the cutter, and means whereby the follower is fed toward the cutter by rotation of said shaft, said last mentioned means embracing a split nut on said shaft and carried by said member whereby it does not rotate with respect to the cutter, the parts of which nut are adapted to be separated to quickly disengage the same from the shaft and permit ready adjustment of the follower.

In testimony whereof, I have signed my name to this specification, in the presence of two subscribing witnesses.

HENRY R. EVANS.

Witnesses:
GORHAM CROSBY,
EDWIN SEGER.

Copies of this patent may be obtained for five cents each, by addressing the "Commissioner of Patents, Washington, D. C."